US012587221B2

(12) United States Patent
Georgi et al.

(10) Patent No.: US 12,587,221 B2
(45) Date of Patent: Mar. 24, 2026

(54) DEVICE FOR IMPROVING RECEPTION AND METHOD FOR IMPROVING RECEPTION

(71) Applicant: Sennheiser electronic SE & Co. KG, Wedemark (DE)

(72) Inventors: Sebastian Georgi, Langenhagen (DE); Jan Watermann, Hannover (DE)

(73) Assignee: Sennheiser electronic SE & Co. KG, Wedemark (DE)

( * ) Notice: Subject to any disclaimer, the term of this patent is extended or adjusted under 35 U.S.C. 154(b) by 421 days.

(21) Appl. No.: 17/853,267

(22) Filed: Jun. 29, 2022

(65) Prior Publication Data

US 2023/0006704 A1     Jan. 5, 2023

(30) Foreign Application Priority Data

Jun. 30, 2021    (DE) .......................... 102021116904.6

(51) Int. Cl.
*H04B 1/10*        (2006.01)
*H04L 27/26*       (2006.01)
*H04W 72/0446*     (2023.01)

(52) U.S. Cl.
CPC ....... *H04B 1/1027* (2013.01); *H04L 27/2649* (2013.01); *H04W 72/0446* (2013.01); *H04B 2001/1063* (2013.01)

(58) Field of Classification Search
CPC ...................... H04B 1/1027; H04B 2001/1063
See application file for complete search history.

(56) References Cited

U.S. PATENT DOCUMENTS 5,325,204 A * 6/1994 Scarpa ..................... H04N 5/21
                                                 708/320
9,628,122 B1 * 4/2017 Clark ................... H04J 11/0066
                       (Continued)

FOREIGN PATENT DOCUMENTS

CN       101510864 A * 8/2009 ........... H04B 1/1036
FR        3114408 A1 * 3/2022 ............. G01S 19/21
                       (Continued)

OTHER PUBLICATIONS

Google English Translation of JP2015-27069A (Year: 2015).*

*Primary Examiner* — Kenny S Lin
(74) *Attorney, Agent, or Firm* — Jon E. Gordon; Haug Partners LLP

(57)                ABSTRACT
When an OFDM radio system which uses a wide frequency band is interfered with by another narrow-band radio system, the interference can frequently be compensated but the transmission quality decreases drastically. Thus, narrow-band interferers in an OFDM radio system are determined according to the invention whereby none of the subscribers of the radio system transmits in a defined time slot or scan slot but all switch at the same time into the receiving mode. If there is interference (P1, P2), it is detected in this time slot. Countermeasures are taken individually in all the mobile devices, in particular the detection of the frequency and strength of the narrowband interference (P1, P2) and the configuration of a flexible notch filter (140) in the time range to the detected frequency and strength. The scanned received signal (RXS) is then filtered in the time range, i.e. before the FFT (120) and the OFDM channel estimation (130) by the correspondingly configured notch filter (140). The notch (S1, S2) of the notch filter thereby acts in the transmission function like a natural break when receiving data.

11 Claims, 2 Drawing Sheets

(56) References Cited

U.S. PATENT DOCUMENTS

| | | | | |
|---|---|---|---|---|
| 10,014,904 | B1 * | 7/2018 | Anand .................. | H04L 1/0071 |
| 10,270,626 | B2 * | 4/2019 | Chen ................. | H04L 25/03159 |
| 2003/0185147 | A1 * | 10/2003 | Taga .................. | H04L 27/2647 |
| | | | | 370/210 |
| 2009/0023404 | A1 * | 1/2009 | Leinonen ............ | H04B 1/1036 |
| | | | | 455/295 |
| 2017/0195143 | A1 * | 7/2017 | Chen ................. | H04L 25/03006 |
| 2018/0019774 | A1 * | 1/2018 | Hampel ............ | H04L 25/03012 |

FOREIGN PATENT DOCUMENTS

| | | | | | | |
|---|---|---|---|---|---|---|
| JP | | 2007202082 | A | * | 8/2007 | |
| JP | | 2015027069 | A | * | 2/2015 | |
| JP | | 2019068160 | A | * | 4/2019 | |
| WO | WO 2004/114617 | A1 | | | 12/2004 | |
| WO | WO-2010018492 | A1 | * | 2/2010 | ........... | H04B 1/1036 |

* cited by examiner a)
b)

c)
d)

DEVICE FOR IMPROVING RECEPTION AND METHOD FOR IMPROVING RECEPTION

CROSS REFERENCE TO RELATED APPLICATION(S)

This application claims the benefit of the foreign priority of German Patent Application No. 10 2021 116 904.6, filed on Jun. 30, 2021, the entirety of which is incorporated herein by reference.

FIELD OF DISCLOSURE

The invention relates to a device for improving reception of radio signals and a method for improving reception of radio signals. In particular, interference of OFDM signals caused by transmitters can be reduced.

BACKGROUND

OFDM (Orthogonal Frequency Division Multiplex) is an efficient multi-carrier modulation method whose carriers (i.e. carrier frequencies) are orthogonal with respect to one another and therefore do not interfere with one another. It is well-suited for distortion correction of interference effects which occur in the radio channel. In particular, so-called fading effects frequently occur due to multipath propagation, e.g. due to interference as a result of reflections. In this case, the transmission properties of the radio channel vary temporally frequently within a short time, e.g. with mobile transmitters or receivers. The insertion of redundancy by channel coding and the distribution of information over many different carrier frequencies make it possible to compensate for a deterioration of the transmission as far as a complete absence of individual frequencies for a certain time so that even with an increased error rate, a large part of the transmitted information can be received or reconstructed.

TDMA (Time Division Multiple Access) is a multiple access method in which the subscribers are assigned radio resources in the form of time slots. In this case, only the respective subscriber can transmit in the corresponding time slot.

Arbitrary transmission or modulation methods including OFDM can be used, wherein naturally all the subscribers of a radio system use the same modulation method and a common time base.

In the area of mobile telephony or mobile internet, reserved frequency bands are used by a few network providers so that by means of an appropriate frequency planning mutual interference of different transmitters can be largely avoided. However, various other radio systems such as, for example, wireless microphone and in-ear monitoring systems for wireless audio data transmission are operated together with many other radio systems in other frequency bands released for this purpose. Therefore it is much more difficult and in many cases almost impossible to coordinate frequencies used and thus avoid mutual interference in this environment. Since the users can frequently manually set the transmission frequency to their respective transmission system without however having the necessary measurement technology for determining free frequencies, unintentional multiple uses of the same radio resource are likely. Thus, interference frequently occurs due to collisions between different radio systems, for example, in exhibition halls or on a fairground.

Now if an OFDM radio system which uses a broad frequency band is interfered with by another radio system that uses, for example, a frequency band of 20 kHz with a different modulation method and therefore is narrow-band compared to the OFDM, in many cases it can be fundamentally possible for the OFDM system to compensate for the interference. However, the error rate increases significantly so that the transmission quality decreases drastically.

In addition, OFDM uses a discrete Fourier transformation (DFT) for demodulation, in particular the fast Fourier transformation (FFT) that is based on discrete and periodic signals. However, since the narrow-band interference signals are usually not periodic, the properties of the FFT and in particular the so-called leakage effect ensure that each interference has a spectrally broadened effect. Window functions are used in the spectral analysis in order to moderate this effect. However, this is not a solution for OFDM because the orthogonality for different radio carriers would thereby be destroyed. The invention is therefore based on the object of making it possible to improve the reception of OFDM radio signals, in particular in connection with narrow-band interferers.

In the priority-substantiating German patent application, the German Patent and Trademark Office has researched the following document: WO 2004/114617 A1.

SUMMARY OF THE INVENTION

The object is achieved by a method according to claim 1. Claim 8 relates to a device according to the invention.

According to the invention, narrow-band interferers are determined in an OFDM system by defining a time slot in which none of the subscribers of the radio system transmits. In this time slot (which is here designated as scan slot) all the subscribers of the radio system simultaneously switch to receiving mode. If there is interference, it is detected in this time slot. Then countermeasures are taken which in particular can be individually different in all mobile devices. This is advantageous since both the respective radio path and also the influence of the interferer can be different in each case. The countermeasures consist in the detection of the frequency and strength of the narrow-band interference and the configuration of at least one flexible notch filter in the time range to the at least one detected frequency and strength. The received signal is then filtered by the correspondingly configured at least one notch filter. This filtering takes place in the time range, i.e. before the FFT and the OFDM channel estimation. The notch of the notch filter in the transmission function therefore acts precisely as a natural break. Thus, during reception of the useful data the receiver can accordingly deal with this in precisely the same way.

Further advantageous embodiments are described in claims 2-11.

BRIEF DESCRIPTION OF THE DRAWINGS

Further details and advantageous embodiments are shown in the drawings. In the drawings

DETAILED DESCRIPTION OF THE INVENTION

Figure 1:
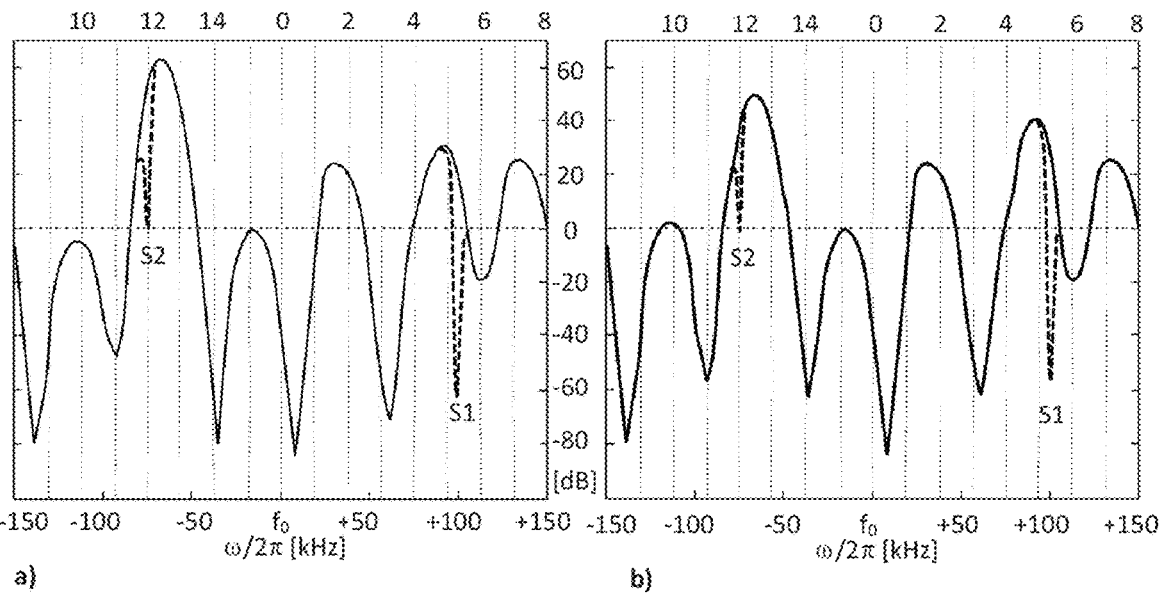
FIG. 1 shows the transmission function of a radio channel with interferers at different time points, and for example, a measurement result of a scan slot.
Figure 1:
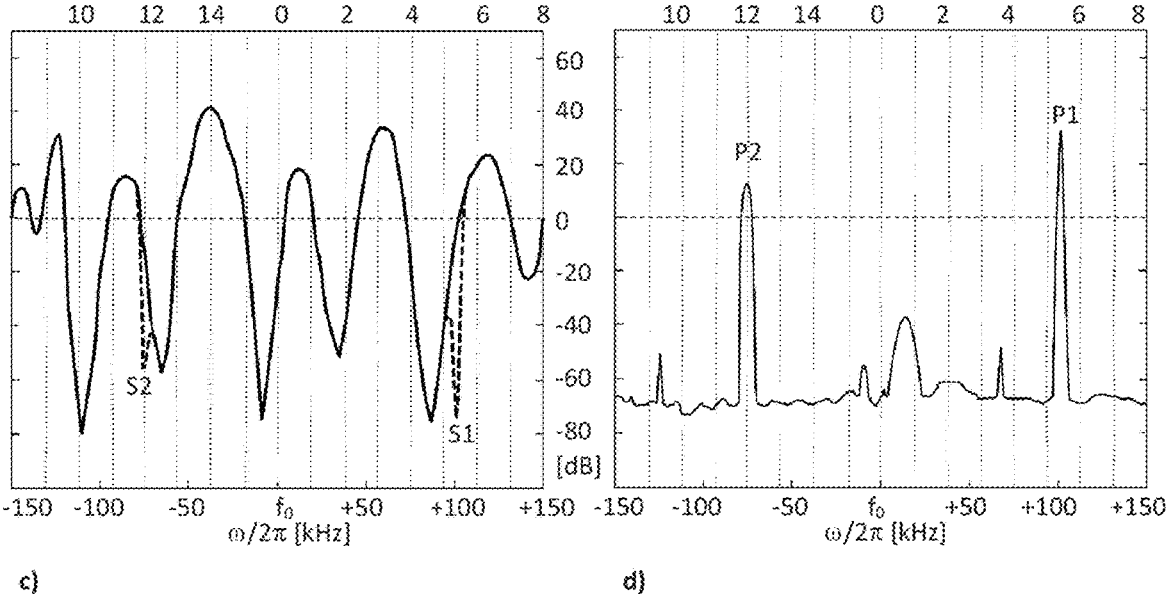

FIG. 1 shows in one example the time variation of the transmission function of a radio channel such as can be used, for example, for OFDM. In this example sixteen carriers at a spacing of 20 kHz are used in a frequency band of ±150 kHz about a central frequency $f_0$. The numbering of the carrier is plotted in each case at the upper edge of each diagram. FIG. 1a) shows the transmission function at a first time point. As a result of crosstalk and interference, e.g. as a result of echoes, excessive increases and breaks occur. These affect the various carriers with different intensity and can vary rapidly. This effect is known as frequency-selective fading. The position of the minima and maxima is in this case fundamentally randomly distributed. Particularly the breaks interfere with the transmission.

FIG. 1 b) shows the transmission function at a later time point. Here, for example, the maximum T at about $f_0$-112 kHz or carrier 10 has increased somewhat, likewise the minimum at $f_0$-37 kHz or carrier 14 and the maximum at $f_0$+90 kHz or carrier 5. OFDM systems are designed to achieve a good transmission quality with a low error rate under such conditions. However, the quality of the transmission deteriorates with every break of the transmission function within the frequency range used. However, the quality deteriorates even more severely with every interferer within the frequency band used, as will be explained further below.

The base station and all the mobile devices of the radio system are time-synchronized and use, for example, a TDMA transmission scheme. In this case, a TDMA frame is defined whose time slots are assigned to the various subscribers.

The TDMA frame usually has time slots for control data and other time slots for useful data, such as audio data. In this case, according to the TDMA transmission scheme, always precisely one subscriber of the radio system can transmit per time slot. As a result of the synchronization, each subscriber knows in which time slot it is his turn to transmit and/or receive so that no collisions occur.

According to the invention, at least one time slot of the TDMA frame is provided as scan slot in which no subscriber of the radio system may transmit. Thus, at each time point only other devices which do not belong to the radio system and therefore from the point of view of the radio system are interferers may transmit. However, in this time slot all the subscribers of the radio system are switched to reception. Both the base station and also all the mobile devices (each for itself) detect in the scan slot whether interference signals are received in the frequency band provided for use and which frequency and reception strength the received interference signals have.

FIG. 1 d) shows an example of how the received signals can appear in the scan slot. Whereas a base noise at, for example, below –60 dB is unavoidable, some frequencies stand out due to stronger signals. Lower values which lie below a threshold value, e.g. in FIG. 1 d) at $f_0$–125 kHz or at $f_0$+15 kHz, can be ignored. The threshold value can be, for example, at –30 dB or between –40 dB and –50 dB or about 25 dB above the base noise. At higher values such as in FIG. 1 d) a peak P1 from a first interfering transmitter at $f_0$+100 kHz or between the carriers 5 and 6 or a peak P2 from a second interfering transmitter at $f_0$–75 kHz or carrier 12, the interference however has a negative effect on the demodulation of the useful signal, in particular on the Fourier transformation. It was established that the interference due to the interfering transmitters has stronger effects than an additional break in the transmission function. According to the invention, therefore at least the most dominant of this interference in frequency and amplitude or reception strength is detected. In the case considered here, the detection can, for example, yield a first frequency of $f_0$+100 kHz with a strength of 80 dB (relative to the base noise). Optionally a second frequency, here of $f_0$–75 kHz with a strength of 70 dB, can additionally be detected.

In other embodiments, even more interferers can be detected. Here however, preferably only those transmitters that transmit constantly over a fairly long time (e.g. for several seconds) at always the same frequency are considered. Thus, the results of several scan slots can be combined with one another (e.g. averaged) in order to distinguish permanent interferers from short-term random interference. For example, TDMA frames having a length of 1 ms can be used of which several (e.g. eight) can be combined into a superframe. Each TDMA frame contains at least one time slot for control data which, for example, can be about 60 µs long, wherein the control data in each frame of the superframe can have a different task. Such a time slot for control data per superframe can be used as scan slot so that the measurement lasts up to about 60 µs and is repeated every 8 ms. In this time the entire frequency range used can be searched. However, also only a part of the frequency range used can be searched in which case the search is continued in the next time slot. However, the measurement can also be repeated at greater time intervals, e.g. after 100 ms.

A notch or notch filter is then configured with the results of the detection, which filters the received signal in the time range (i.e., before the Fourier transformation). As a result, this filtering is superposed with the transmission function of the channel as shown in FIGS. 1 a) and b). This has the advantage that the break produced due to the filtering for the receiver and in particular for the following FFT, channel estimation and distortion correction of the OFDM system appears precisely as a natural break as a result of the frequency-selective fading. Thus, no further particular processing steps are required and the following components of the receiver can be conventional. Nevertheless, the reception quality improves appreciably since the signals of the interferer are effectively suppressed.

In FIG. 1 a) and b) the effects of the filter are indicated as additional minima S1, S2 or notches of the transmission function according to the peaks P1, P2. In this case, the intensity of the filtering is adapted to the reception strength of the respective interferer whereby the notch filter at SD1 more strongly damps the signal than the notch filter at S2 because the interference signal P1 is stronger than P2. In one embodiment the intensity of the damping S1, S2 by the notch filter merely depends on the strength of the interference signal P1, P2 but not on the current value of the transmission function of the channel. Therefore, the damping S1, i.e. the "depth" of the notch in decibels in FIG. 1b) is the same as in FIG. 1a) although at this frequency the value of the transmission function of the channel has changed (here it is pointed out that the drawings are not absolutely true to scale). All the same, the damping S1 at a later time point that is shown in FIG. 1c) is always the same although the value of the transmission function of the channel has changed significantly at this point due to frequency-selective fading.

However, the intensity of the damping S1, S2 by the notch filter does not correspond absolutely directly to the ratio between the strength of the interference signal P1, P2 and the thermal noise. Here also, the drawings are not true to scale. The intensity of the damping by the notch filter is dimensioned so that the leakage effect is largely and in the ideal case, completely suppressed. For example, a peak P1 of +80 dB can result in a damping S1 of 60 dB.

Figure 2:
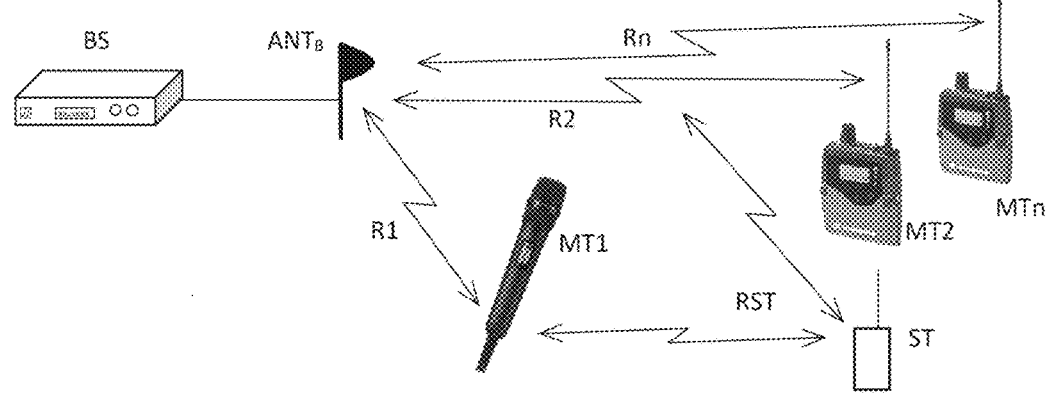
FIG. 2 shows a schematic overview of a radio system.

FIG. 2 shows schematically an example of an OFDM radio system. In this case, a base station BS is in radio communication with several mobile devices MT1, MT2, . . . , MTn. Although a base station and three mobile devices are shown here, in principle there can be more or less mobile devices and/or base stations. In this example, the base station uses one or more active antennae $ANT_B$. All the subscribers of the OFDM radio system are time-synchronized and they use the same time base and the same TDMA frame. A narrow-band transmitting device ST which is not part of the OFDM radio system on the other hand is not synchronized with the other components and constitutes an interferer. Its radio signal RST interferes with the radio signals R1, R2, Rn of the OFDM radio system and influences reception both at the mobile devices MT1, MT2, MTn and also at the base station BS. The improvement in reception according to the invention can be carried out in one, several or in each of the mobile devices MT1, MT2, MTn separately and in the base station BS or in the active antenna(e) $ANT_B$. Fundamentally it only acts on the reception by the respective device but not generally on the other subscribers of the OFDM radio system.

Figure 3:
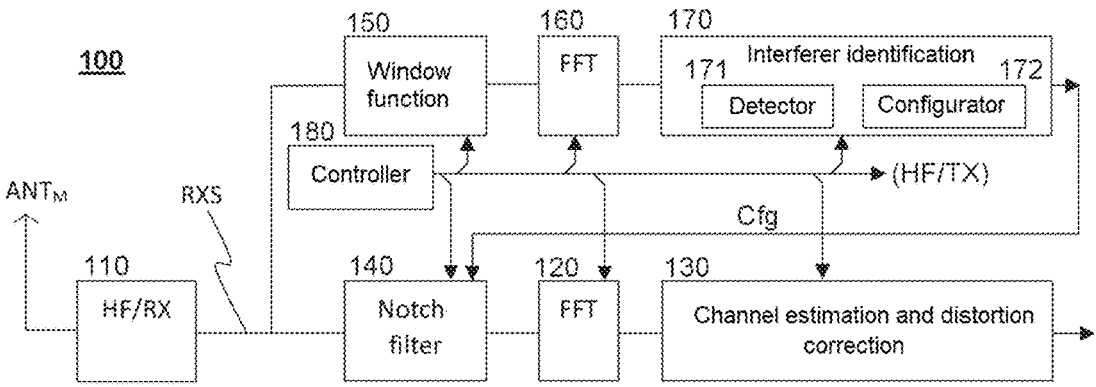
FIG. 3 shows a block diagram of a receiver in one embodiment.

FIG. 3 shows in one embodiment of the invention a block diagram of a receiver. The receiver 100 contains a high-frequency or radio module 110 that scans the signals received via an antenna $ANT_M$ and thus converts into individual scanning values RXS (RX samples). In a conventional OFDM demodulator the scanning values would be directly subjected to a FFT 120 and subsequent channel estimation and distortion correction 130 in the frequency range whereby the notches which usually occur in the transmission function of the channel due to superposition of reflections are compensated. According to the invention however, at least one flexibly configurable notch filter 140 is located upstream of the FFT. The notch filter 140 is re-configured at certain time points which are predefined by a time controller 180. The configuration data Cfg are determined according to the received signal, as described above. For this purpose, a configuration branch is provided which is also controlled by the time controller 180 and is only active during the scan slot. In the configuration branch the scanning values of the radio module 110 are supplied to a window function 150 for spectral analysis. The results thereof are fed to an FFT 160 which performs a transformation of the time signal limited by the window function 150 in the frequency range and relays the transformed signal to a module 170 for identification or detection of interferers. This contains in principle a detector 171 which detects the frequency and the strength of the dominant interferer(s) and a configurator 172 which controls the corresponding configuration of the notch filter. The configurator 172 can, for example, determine configuration data Cfg such as filter coefficients for the notch filter. These can be read from a memory, e.g. according to frequency and/or degree of damping required, filter quality etc. The notch filter is then configured with the configuration data Cfg. The following modules, in particular the FFT 120 and the channel estimation and distortion correction 130, can be conventional and require no particular adaptation. In the case where two or more notch filters are used, these can be connected directly in series so that the block 140 forms a cascade of notch filters.

The time controller 180 can also control further components of the mobile device and, for example, perform the complete time slot (TDMA) control. The control can therefore optionally also affect a transmitter TX (not shown) contained in the mobile device since this can only transmit in certain time slots. In this case, the time controller 180 is not an additional module but is present as it were in a corresponding mobile device for OFDM-based TDMA.

An advantage of the invention is that in the signal path apart from the notch filter, no further additional processing such as a window function, for example, is used because any additional processing can bring about a deterioration in the signal quality. Another advantage is that no leakage effect occurs due to signals from unfiltered interferers so that the interference can be kept to a minimum. Since the received signals are not demodulated in the configuration branch, the window function 150 here is not harmful in this regard. A further advantage is that the usual function blocks of the OFDM receiver, in particular HF receiver 110, FFT 120, channel estimation and distortion correction 130 and all the following modules can stay unchanged. Thus, the additional modules 140-170 form a separate unit and can, for example, be developed and tested separately in the design process of the circuit. The circuit of the receiver 100 can be implemented with one or more processors and optionally further components, for example, specific microchips (e.g. FPGAs).

For a wide-band radio system the invention thus enables the automatic, dynamic suppression of narrow-band interferers on the receiver side in a decentralized manner and without requiring special signalling, e.g. between the base station and the mobile devices. As a result, both the signalling expenditure and the need for user interventions are minimized. Also a point-to-multipoint transmission (multicast) e.g. for in-ear monitoring would be difficult or impossible on account of the different reception conditions at each mobile device.

Figure 4:
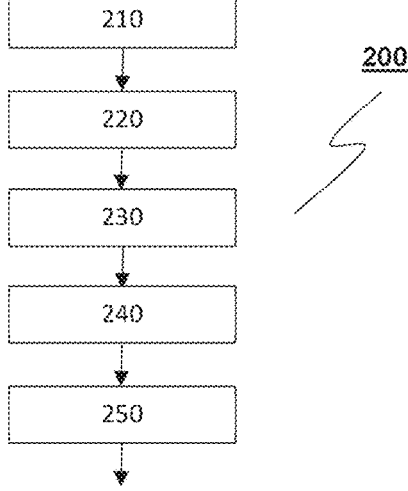
FIG. 4 shows a flow diagram of a method according to the invention in one embodiment.

Optionally however, it can also be possible to transmit the values of the interference detected in the respective interferer detection module 170 from the mobile devices to the base station so that a complete analysis of the situation in relation to interferers can be made. In this way, interferers can, for example, be localized and then eliminated. Each subscriber uses the samples received in the scan slot to determine the dominant interferers with the aid of a Fourier analysis. One or more subscribers then transmit data via the respective detected interference to the base station. The base station receives this information and records this together with the information as to which subscriber it comes from in each case. The result can be a list with frequency and strength of the detected interferers and the recording subscriber in each case. The base station can be configured to output this information. This can optionally be accomplished via a display or the data can be relayed to an external data processing device. A relevant monitoring software can run on the external data processing device which controls the necessary outputs. The operator of the system can evaluate this data and use it to find and deactivate the interfering device. Since he also knows which subscriber has reported the interferer, by means of the strength of the measured interference by the individual subscribers, he can concentrate the local search area on an area in the vicinity of the subscribers who have reported a stronger interference. From the received data he also knows the frequency at which the interferer is transmitting and can optionally, using a corresponding measuring device, search for the interferer which is transmitting at this frequency. FIG. 4 shows in one embodiment a flow diagram of a method according to the invention for improving the reception of OFDM radio signals in a radio system with at least one base station and one or more mobile devices.

The method 200 comprises the defining 210 or marking of a time window in which neither the base station(s) nor the mobile devices pertaining to the radio system may transmit. This time window can be determined by means of a local time controller 180 which is present at each subscriber of the radio system. In principle however, a central control by a base station is also possible. Each mobile device of the radio system and optionally also the base station(s) attempts to receive 220 interference signals during this time window. In this case, the frequency range used or at least a part thereof can be scanned. The time slot is therefore also designated as scan slot. If interference signals are present, the frequency thereof and reception strength is detected 230. In the case of several interferers, the dominant interferer or interferers can be determined. Then at least one notch filter is adapted 240 to the detected frequency and strength and the received signal in the time range is filtered with the adapted notch filter. The filtered signal is then transformed 250 by means of a FFT into the frequency range and a channel estimation and distortion correction is carried out. In this case, a distinction is not made between naturally occurring minima or notches of the transmission function and those which are produced by the notch filter or filters. Further processing steps for demodulation take place conventionally. In the event that no interferers are detected or no interference signals are present, the notch filter 140 can be switched to transparent or bridged in one embodiment so that it has no influence on the received signal.

The scanning values of the received signal therefore, at least outside the scan slot, do not need to pass through any further additional processing steps which could result in a deterioration of the signal.

In one embodiment, the scan slot lasts up to 100 µs and is repeated at regular intervals of at most 100 ms. The time control block 180 can control when the interferer identification 170 is carried out and when the notch filter 140 is reconfigured by the configuration data Cfg.

The invention can be implemented with one or more configurable processors. The configuration is accomplished by a computer-readable data carrier with instructions stored thereon which are suitable for programming the processor or processors in such a manner that these can execute the steps of the method described above.

The invention claimed is:

1. A method for improving reception of OFDM radio signals in a radio system comprising at least one base station and one or more mobile devices, comprising the steps:

defining a time window in which neither the base station nor a mobile device pertaining to the radio system may transmit;

in the mobile devices of the radio system receiving signals during the defined time window wherein the received signals are interference signals;

detecting a frequency and a reception strength of at least one of the received interference signals;

adapting a notch filter to the detected frequency and reception strength, wherein the notch filter filters the received signal in the time range; and transforming the received signal filtered by the notch filter by means of a Fourier transformation in the frequency range and performing a channel estimation and distortion correction of the transformed received signal;

wherein the defined time window and the receiving, detecting and adapting in the respective time windows is repeated at specific intervals; and wherein the radio system uses a time division multiple access method with a TDMA frame and the defined time window is a time slot of the TDMA frame, wherein the defined time slot lasts at most 100 µs and is repeated regularly at least every 100 ms.

2. The method according to claim 1, wherein a transmission function of the notch filter has a break whose frequency and depth only depend on the detected frequency and reception strength of the received interference signal.

3. A computer-readable data carrier with instructions stored thereon which are suitable for programming a computer or processor in such a manner that this executes the steps of the method according to claim 1.

4. The method according to claim 1, wherein outside the defined time window the scanning values of the received signal do not undergo any further processing and in particular no window function before the notch filter and the Fourier transformation.

5. A method for improving reception of OFDM radio signals in a radio system comprising at least one base station and one or more mobile devices, comprising the steps:

defining a time window in which neither the base station nor a mobile device pertaining to the radio system may transmit;

in the mobile devices of the radio system receiving signals during the defined time window wherein the received signals are interference signals;

detecting a frequency and a reception strength of at least one of the received interference signals;

adapting a notch filter to the detected frequency and reception strength, wherein the notch filter filters the at least one received interference signal; and transforming the received signal filtered by the notch filter by means of a Fourier transformation in the frequency range and performing a channel estimation and distortion correction of the transformed received signal;

wherein the mobile devices transmit data regarding their respective received interference signals to the base station and wherein the base station is configured to output this data.

6. A device for improving reception of OFDM radio signals in a radio system with at least one base station and one or more mobile devices, comprising a high-frequency scanning block, which outputs scanning values of a received signal;

an FFT block for transformation of the scanning values in the frequency range; and a channel estimation and distortion correction block, which receives output signals of the FFT block for further processing;

characterized in that the device additionally contains:

a configurable notch filter, wherein the scanning values of the received signal only pass through the configurable notch filter and are then output to the FFT block; and a configuration circuit for configuration of the configurable notch filter which comprises a time control block, wherein the configuration circuit processes scanning values of the received signal in a time window determined by the time control block, detects frequency and reception strength of at least one interference signal therein and configures the configurable notch filter according to the interference signal;

wherein neither the base station nor the one or more mobile devices transmit in the time window determined by the time control block and wherein the configuration circuit is only active within the time window characterized by the signal.

7. The device according to claim 6, wherein the device is part of the mobile device or part of an active antenna connected to the base station.

8. The device according to claim 6, wherein the time window lasts at most 100 μs and the time control block repeats the time window at regular intervals of at most 100 ms.

9. The device according to claim 6, wherein the configuration circuit additionally comprises a window function block, an FFT block and a block for interference detection and wherein the block for interference detection outputs data for configuration of the configurable notch filter.

10. The device according to claim 6, wherein the transmission function of the configurable notch filter has a break whose frequency corresponds to the detected interference frequency of the interference signal and whose depth depends on the detected reception strength of the interference signal.

11. A device for improving the reception of OFDM radio signals in a radio system with at least one base station and one or more mobile devices, comprising:

a high-frequency scanning block, which outputs scanning values of a received signal;

an FFT block for transformation of the scanning values in the frequency range; and a channel estimation and distortion correction block, which receives output signals of the FFT block for further processing;

characterized in that the device additionally contains:

a configurable notch filter, wherein the scanning values of the received signal only pass through the configurable notch filter and are then output to the FFT block; and a configuration circuit for configuration of the configurable notch filter which comprises a time control block, wherein the configuration circuit processes scanning values of the received signal in a time window determined by the time control block, detects frequency and reception strength of at least one interference signal therein and configures the configurable notch filter according to the interference signal;

wherein the mobile devices are configured to transmit data regarding their respective received interference signals to the base station.

* * * * *